US012633266B2

(12) United States Patent
Chen et al.

(10) Patent No.: US 12,633,266 B2
(45) Date of Patent: May 19, 2026

(54) DISPLAY DEVICE AND BACKLIGHT COMPENSATION METHOD USING AREA PEAK LUMINANCE OF ADJACENT LIGHTING REGIONS

(71) Applicant: AUO Display Plus Corporation, Hsinchu City (TW)

(72) Inventors: Po-Kun Chen, Hsinchu City (TW); Chia Sheng Chu, Hsinchu City (TW); Chia Chia Li, Hsinchu City (TW); Ren-Wei Huang, Hsinchu City (TW)

(73) Assignee: AUO Display Plus Corporation, Hsinchu (TW)

( * ) Notice: Subject to any disclaimer, the term of this patent is extended or adjusted under 35 U.S.C. 154(b) by 0 days.

(21) Appl. No.: 19/002,719

(22) Filed: Dec. 27, 2024

(65) Prior Publication Data

US 2025/0131892 A1 Apr. 24, 2025

(30) Foreign Application Priority Data

Dec. 5, 2024 (TW) ................................ 113147320

(51) Int. Cl.
*G09G 3/34* (2006.01)

(52) U.S. Cl.
CPC ..... *G09G 3/3426* (2013.01); *G09G 2320/066* (2013.01); *G09G 2320/0686* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 11,593,923 | B2 | 2/2023 | Min et al. | |
| 2012/0139885 | A1* | 6/2012 | Iwasa .................. | G09G 3/3426 345/207 |
| 2016/0335957 | A1* | 11/2016 | Fu ........................ | G09G 3/3426 |
| 2021/0193058 | A1 | 6/2021 | Lee et al. | |

FOREIGN PATENT DOCUMENTS

| | | |
|---|---|---|
| CN | 118781979 A | 10/2024 |

* cited by examiner

*Primary Examiner* — Donna V Bocar

(57) ABSTRACT

A display device has a backlight module with a plurality of light-emitting units. The light-emitting units are divided into a plurality of groups, and each group constitutes a lighting region. A backlight compensation method includes performing a local dimming process according to a gamma value of a display device by a backlight module; obtaining an area peak luminance of each lighting area; selecting one of the lighting regions as a selected region; obtaining a regional average luminance value based on the area peak luminance of the selected region and the area peak luminance of other lighting regions adjacent to the selected region; obtaining a luminance adjustment ratio based on a partial peak ratio corresponding to the regional average luminance value; obtaining a compensation luminance value based on the luminance peak value and the luminance adjustment ratio; and adjusting the luminance of the selected region based on the compensation luminance value.

10 Claims, 4 Drawing Sheets

21

| | | |
|---|---|---|
| A11 (APL 10%) | A12 (APL 70%) | A13 (APL 70%) |
| A14 (APL 50%) | A15 (APL 50%) | A16 (APL 70%) |
| A17 (APL 70%) | A18 (APL 30%) | A19 (APL 70%) |

FIG. 5A

T11

| Regional average luminance value | Luminance adjustment ratio |
|---|---|
| 10% | 100% |
| 30% | 85% |
| 50% | 75% |
| 70% | 60% |
| 100% | 50% |

FIG. 5B

21

| | | |
|---|---|---|
| A11 (7.7%) | A12 (57.4%) | A13 (20.1%) |
| A14 (38.5%) | A15 (37.5%) | A16 (52.5%) |
| A17 (54.6%) | A18 (19.5%) | A19 (52.5%) |

FIG. 5C

DISPLAY DEVICE AND BACKLIGHT COMPENSATION METHOD USING AREA PEAK LUMINANCE OF ADJACENT LIGHTING REGIONS

FIELD OF THE INVENTION

The present invention relates to a display device and a backlight control method, and more particularly to a display device and a backlight compensation method.

BACKGROUND OF THE INVENTION

A submillimeter light-emitting diode (Mini-LED) display technology has been widely used in a variety of display devices, mainly because the technology can provide a higher luminance, contrast, and better color accuracy. In a backlight module with Mini-LEDs as light-emitting units, these light-emitting units are usually divided into a plurality of regions, and each area can be dimmed separately to improve the display performance. However, a dimming algorithm of a traditional Mini-LED local dimming technology mainly aims to reduce energy, which leads to degradation of display performance under specific conditions and causes an optical characteristic problem especially under different windowing ratios and grayscale values.

Specifically, the traditional local dimming technology has a problem with a low luminance and low gamma value at different windowing ratios. The windowing ratio means a ratio of a bright area in a display image, and different windowing ratios cause a change in energy distribution of the light-emitting unit. When the windowing ratio is low, a traditional dimming algorithm may not be able to provide sufficient luminance compensation, resulting in a poor display result. Similarly, at different grayscale levels, the traditional dimming technology cannot effectively maintain the stability of a gamma curve, resulting in the weakening of image contrast and sense of layers.

In addition, an AmLED technology, as an improved local dimming technology, can increase the luminance at different windowing ratios and grayscale levels through light expansion compensation or direct improvement of grayscale compensation. However, this method can still lead to an increase in a halo effect and a decrease in data resolution, which can further affect the accuracy and display quality of an image. The halo effect means a halo phenomenon that appears around a high luminance area, which blurs edges of the image and affects the visual experience. In addition, the direct increase of the grayscale compensation can increase the luminance, but can also reduce detail representation and accuracy of the image.

Although Mini LED and AmLED technologies have significant advantages in many aspects, there are still issues in practical application, including unstable optical characteristics, the halo effect, the grayscale compensation, and the like. Therefore, effectively solving the above problems helps further development and application of a submillimeter light-emitting diode technology, which is currently one of important issues.

SUMMARY OF THE INVENTION

The present invention provides a display device and a backlight compensation method for enhancing regional contrast, to improve the optical quality of the display device, and further solve the instability of optical characteristics and halo effect caused by regional dimming.

To achieve the above purpose, the present invention provides a backlight compensation method for enhancing regional contrast, which is applied to a display device. The display device includes a backlight module with a plurality of light-emitting units arranged in an array. The light-emitting units are divided into a plurality of groups, and each group constitutes a lighting area. The backlight compensation method includes performing a local dimming process on the backlight module according to a gamma value of a display device by a backlight module; obtaining the area peak luminance of each light-emitting region; selecting one light-emitting region as a selected region; obtaining a regional average luminance value based on the area peak luminance of the selected region and area peak luminances of light-emitting regions adjacent to the selected region; obtaining a luminance adjustment ratio based on a partial peak ratio corresponding to the regional average luminance value; obtaining a compensation luminance value based on the area peak luminance and the luminance adjustment ratio; and adjusting a luminance of the selected region based on the compensation luminance value.

In an embodiment of the present invention, the partial peak ratio is stored in a partial peak ratio comparison table.

In an embodiment of the present invention, the compensation luminance value is a product of the area peak luminance and the luminance adjustment ratio.

In an embodiment of the present invention, the partial peak ratio ranges from 1% to 100%.

In an embodiment of the present invention, the partial peak ratio performs a detailed node interpolation tuning by a plurality of partial peak ratio comparison tables.

In addition, to achieve the above purpose, the present invention provides a display device, including a backlight module, a display module, and a driving module. The backlight module is provided with a plurality of light-emitting units arranged in an array. The light-emitting units are divided into a plurality of groups, each group constitutes a light-emitting region, and the light-emitting region has an area peak luminance. In addition, one light-emitting region is used as a selected region, and a regional average luminance value is obtained between the area peak luminance of the selected region and area peak luminances of light-emitting regions adjacent to the selected region. The display module is configured to display an image. The driving module is coupled to the backlight module and the display module, where the driving module executes a local dimming process according to a gamma value on the backlight module, and drives a luminance of the selected region to be a compensation luminance value based on the area peak luminance and a luminance adjustment ratio. The luminance adjustment ratio is obtained based on a partial peak ratio corresponding to the regional average luminance value, and the compensation luminance value is obtained based on the area peak luminance and the luminance adjustment ratio.

In an embodiment of the present invention, the light-emitting unit includes a submillimeter light-emitting diode.

In an embodiment of the present invention, the driving module executes the local dimming process based on a gamma value of 2.2 of the display device.

Based on the above description, in the display method and the backlight compensation method for enhancing the regional contrast, the average luminance of light-emitting regions adjacent to each light-emitting region is considered for an adjustment strategy in the present invention, so that the average luminance of each light-emitting region is adjusted. Therefore, the stability of optical characteristics of the display device and the halo effect are improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 5A shows a schematic diagram of light-emitting regions of the backlight module and corresponding area peak luminance;

FIG. 5B shows a partial peak ratio comparison table; and

FIG. 5C shows a schematic diagram of light-emitting regions of the backlight module and corresponding compensation luminance values.

DETAILED DESCRIPTION OF PREFERRED EMBODIMENTS

Figure 1:
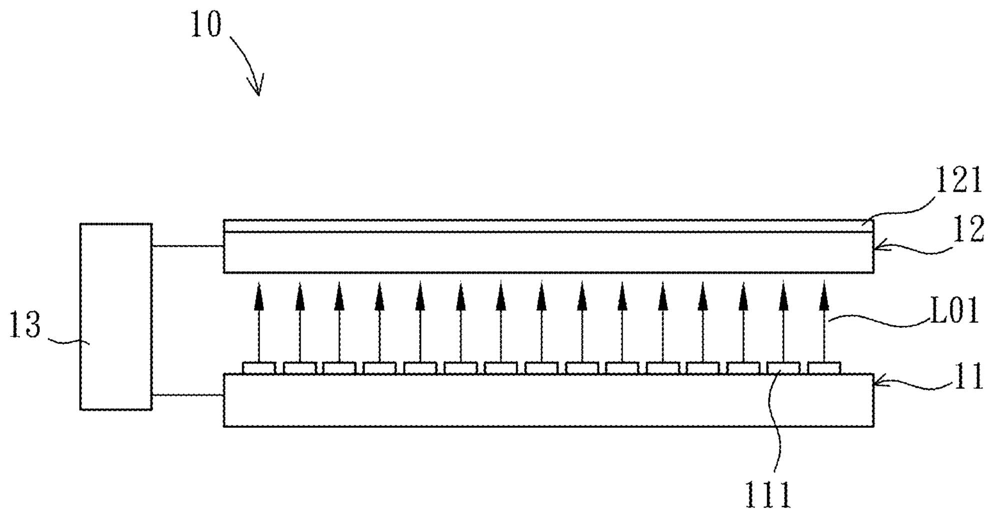
FIG. 1 shows a schematic structural diagram of a display device according to a preferred embodiment of the present invention.

With reference to FIG. 1, a display device 10 in a preferred embodiment of the present invention includes a backlight module 11, a display module 12, and a driving module 13. In this embodiment, the driving module 13 can drive the backlight module 11 and the display module 12 separately, so that light rays L01 emitted by the backlight module 11 pass through the display module 12 and then display an image on a display panel 121.

Figure 2:
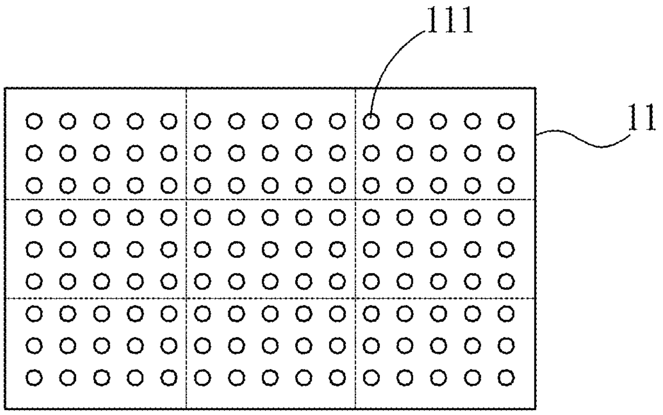
FIG. 2 shows a schematic diagram of layout area division of light-emitting units in a backlight module according to the present invention.
Figure 3:
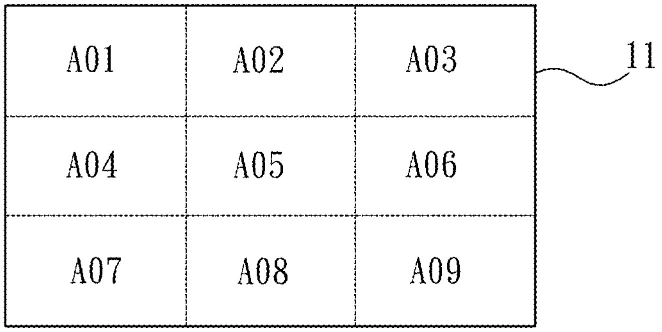
FIG. 3 shows a schematic diagram of a light-emitting region of the backlight module according to the present invention.

The backlight module 11 is a direct-type backlight module. As shown in FIG. 2, the backlight module 11 is provided with a plurality of light-emitting units 111 arranged in an array, including but not limited to light-emitting diodes (LEDs), organic light-emitting diodes (OLEDs), submillimeter light-emitting diodes (Mini LEDs), or micro light-emitting diodes (Micro-LEDs). In this embodiment, the Mini-LEDs are used as an example. The so-called array arrangement refers to the light-emitting units 111 is row, column of the arrangement of combinations, which is not limited to the alignment of the arrangement, or staggered arrangement. With reference to FIG. 2 and FIG. 3, the light-emitting units 111 arranged in an array are divided into a plurality of groups, and each group constitutes a light-emitting region. In this embodiment, nine light-emitting regions A01 to A09 are used as an example, which is not limited thereto, or divided into, for example, 512 light-emitting regions or 1024 regions. Moreover, each light-emitting region may include only one light-emitting unit.

Still refer to FIG. 1. The driving module 13 is coupled to the backlight module 11 and the display module 12 to control a dimming and compensation process of the light-emitting units 111 of the backlight module 11.

Figure 4:
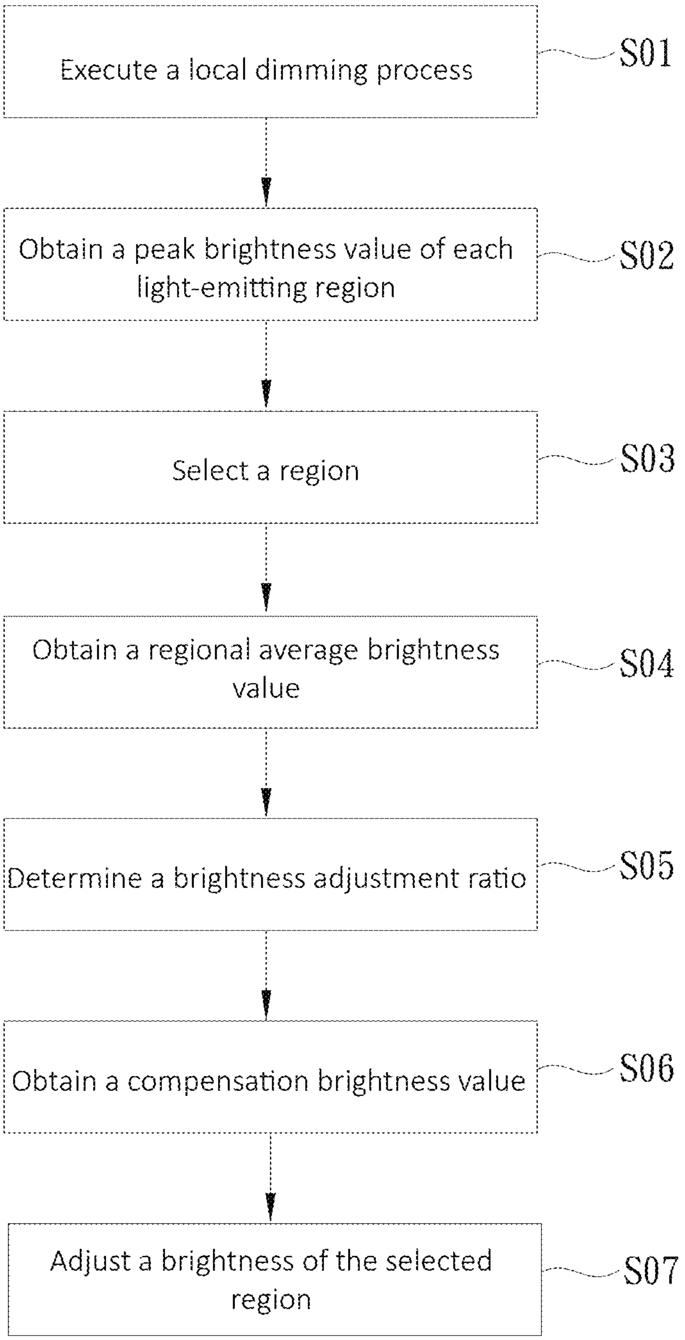
FIG. 4 shows a flowchart of a backlight compensation method according to a preferred embodiment of the present invention.

Next, referring to FIG. 1 to FIG. 4, a backlight compensation method for enhancing regional contrast in a preferred embodiment of the present invention is described. FIG. 4 shows a flowchart of a backlight compensation method according to a preferred embodiment of the present invention. The backlight compensation method includes step S01 to step S06.

Step S01: perform a local dimming process based on a gamma value (e.g. Gamma 2.2) of a display device 10 by a backlight module 11. In this embodiment, the local dimming process includes that a backlight module 11 independently adjusts a luminance of each light-emitting unit 111 based on a luminance of each part of a display image. In this way, when a dark image is displayed, a luminance of a corresponding light-emitting unit 111 can be reduced to increase a black degree. When a bright image is displayed, a luminance of a corresponding light-emitting unit 111 can be increased to enhance a luminance of the image. An AmLED technology may be used for the local dimming process, an active matrix driver circuit is used to control on/off of each submillimeter LED, or precise luminance control is performed on each area. In other words, in this embodiment, gamma compensation is performed by performing the local dimming process, and a gamma value is maintained at 2.2 by adjusting the backlight luminance in different display areas.

Step S02: obtain an area peak luminance (APL) of each of the light-emitting regions A01 to A09. In the backlight modules 11 of the display device 10, the area peak luminance of each light-emitting region A01-A09 can be obtained through a light detection component, such as a photodiode. There may be one or more light detection components, which is not limited herein.

Step S03: select one light-emitting region as a selected region. The selected region may be selected in sequence or randomly, which is not limited herein. Therefore, for example, a light-emitting region A01 is first selected.

Step S04: obtain a regional average luminance value based on the area peak luminance of the selected region and area peak luminance of light-emitting regions adjacent to the selected region. Refer to FIG. 3. A selected region in this embodiment is the light-emitting region A01. Therefore, adjacent light-emitting regions of the light-emitting region A01 include light-emitting regions A02, A04, and A05. Then, a regional average luminance value is obtained based on area peak luminance of the light-emitting regions A01, A02, A04, and A05. In this embodiment, the regional average luminance value can be obtained by adding the area peak luminance of the light-emitting regions A01, A02, A04, and A05 and dividing by 4.

Step S05: determine a luminance adjustment ratio based on a partial peak ratio (PPR) corresponding to the regional average luminance value. The partial peak ratio is a positive number ranging from 1% and 100%, which can be stored in a partial peak ratio comparison table. The partial peak ratio comparison table can be generated through real-time computation, laboratory simulation, or testing, which is not limited herein. It is worth mentioning that the partial peak ratio can perform a detailed node interpolation tuning by a plurality of partial peak ratio comparison tables.

Step S06: obtain a compensation luminance value. The compensation luminance value is obtained based on the area peak luminance and the luminance adjustment ratio. In this embodiment, the compensation luminance value is a product of the area peak luminance and the luminance adjustment ratio.

Step S07: adjust a luminance of a selected region. In this embodiment, the luminance of the selected region A01 is adjusted based on the compensation luminance value. Then, step S03 to step S07 can be repeated until all the light-emitting regions are adjusted based on corresponding compensation luminance values, and then backlight compensation corresponding to the display image is completed.

Refer to FIG. 5A to FIG. 5C. A backlight compensation method in the present invention is described in an example. In a display device for implementing the present invention, a backlight module 21 uses mini LEDs as light-emitting units and is divided into nine light-emitting regions A11 to A19. When the display device displays a specific image, regional dimming is performed based on a gamma value (such as Gamma 2.2) of the display device.

First, the area peak luminance of all light-emitting regions A11 to A19 are obtained respectively. In this embodiment, the area peak luminance is expressed as a percentage. For example, as shown in FIG. 5A, the area peak luminance of the light-emitting region A11 is APL 10%, the area peak luminance of the light-emitting region A12 is APL 70%, the area peak luminance of the light-emitting region A13 is APL 30%, the area peak luminance of the light-emitting region A14 is APL 50%, the area peak luminance of the light-emitting region A15 is APL 50%, the area peak luminance of the light-emitting region A16 is APL 70%, the area peak luminance of the light-emitting region A17 is APL 70%, the area peak luminance of the light-emitting region A18 is APL 30%, and the area peak luminance of the light-emitting region A19 is APL 70%.

Next, the light-emitting region A11 is used as a first selected region, and then a regional average luminance value of these adjacent light-emitting regions A11, A12, A14, and A15 is calculated based on the area peak luminance of the selected region (light-emitting region A11) and adjacent light-emitting regions A12, A14, and A15, that is, (10%+70%+50%+50%)/4=45%. It is worth mentioning that the area peak luminance or regional average luminance value in this embodiment is expressed as a percentage, but can alternatively be expressed in nits or candles per square meter (cd/m2) in other embodiments.

Next, refer to FIG. 5B. In a partial peak ratio comparison table T11, a corresponding luminance adjustment ratio of 77% can be obtained based on a regional average luminance value of 45%. In this embodiment, the partial peak ratio comparison table T11 only lists luminance adjustment ratios corresponding to regional average luminance values of 30% and 50% regions, which are 85% and 75%, respectively. Through proper calculation, a luminance adjustment ratio corresponding to a regional average luminance value of 45% is 77%. Next, as shown in FIG. 5C, the area peak luminance (10%) of the selected region (light-emitting region A11) is multiplied by a luminance adjustment ratio of 77%, to obtain a compensation luminance value of 7.7%.

Refer to FIG. 5A. The light-emitting region A12 is selected as a second selected region, and then based on the area peak luminance of a selected region (light-emitting region A12) and adjacent light-emitting regions A11, A13, A14, A15, and A16, a regional average luminance value of these adjacent light-emitting regions A11, A12, A13, A14, A15, and A16 is calculated, namely, (10%+70%+30%+50%+50%+70%)/6=46.67%.

Next, refer to FIG. 5B. In a partial peak ratio comparison table T11, a corresponding luminance adjustment ratio of 82% can be obtained based on a regional average luminance value of 46.67%. In this embodiment, the partial peak ratio comparison table T11 only lists luminance adjustment ratios corresponding to regional average luminance values of 30% and 50% regions, which are 85% and 75%, respectively. Through proper calculation, a luminance adjustment ratio corresponding to a regional average luminance value of 46.67% is 82%. Next, as shown in FIG. 5C, an area peak luminance (70%) of the selected region (light-emitting region A12) is multiplied by a luminance adjustment ratio of 82%, to obtain a compensation luminance value of 57.4%, and the luminance of the selected region (light-emitting region A12) is adjusted accordingly.

Then the above steps are performed on the light-emitting regions A13 to A19, so that a compensation luminance value corresponding to each light-emitting region can be obtained, and a luminance of a backlight area is corrected to enhance regional contrast. It should be noted that in this example, backlight compensation is performed in the order from the light-emitting region A11 to the light-emitting region A19. In other examples, backlight compensation can alternatively be performed in the order of A11, A14, A17, A12, A15, A18, A13, A16, and A19, provided that software and hardware can be coordinated. Of course, in other embodiments, the order in which the backlight compensation is performed may be randomly selected.

Through the above description, the display device and backlight compensation method in the present invention can effectively compensate for the luminance at different windowing ratios and grayscale levels to enhance regional contrast, reduce the halo effect, and maintain stable gamma values and high luminance of the display device, thereby improving the display quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight compensation method, applied to a display device, wherein the display device comprises a backlight with a plurality of light-emitting units arranged in an array, the plurality of light-emitting units are divided into a plurality of groups, each of the plurality of groups constitutes a light-emitting region, and the backlight compensation method comprises the following steps:

performing, by the backlight, a local dimming process according to a gamma value of the display device;

obtaining an area peak luminance of each of the light-emitting regions;

selecting one of the light-emitting regions as a selected region;

obtaining a regional average luminance value based on the area peak luminance of the selected region and area peak luminances of the light-emitting regions adjacent to the selected region;

obtaining a luminance adjustment ratio based on a partial peak ratio corresponding to the regional average luminance value;

obtaining a compensation luminance value based on the area peak luminance and the luminance adjustment ratio; and adjusting a luminance of the selected region based on the compensation luminance value.

2. The backlight compensation method according to claim 1, wherein the partial peak ratio is stored in a partial peak ratio comparison table.

3. The backlight compensation method according to claim 1, wherein the compensation luminance value is a product of the area peak luminance and the luminance adjustment ratio.

4. The backlight compensation method according to claim 1, wherein the partial peak ratio ranges from 1% to 100%.

5. The backlight compensation method according to claim 1, wherein the partial peak ratio performs a detailed node interpolation tuning by a plurality of partial peak ratio comparison tables.

6. A display device, comprising:

a backlight, having a plurality of light-emitting units arranged in an array, wherein the plurality of light-emitting units are divided into a plurality of groups, each of the plurality of groups constitutes a light-emitting region, the light-emitting region has an area peak luminance, one of the light-emitting regions is selected as a selected region, and a regional average luminance value is obtained based on the area peak luminance of the selected region and the area peak luminances of light-emitting regions adjacent to the selected region;

a display, configured to display an image; and a driver, coupled to the backlight and the display, wherein the driver executes a local dimming process according to a gamma value on the backlight, and drives a luminance of the selected region to be a compensation luminance value based on the area peak luminance and a luminance adjustment ratio, wherein the luminance adjustment ratio is obtained based on a partial peak ratio corresponding to the regional average luminance value, and the compensation luminance value is obtained based on the area peak luminance and the luminance adjustment ratio.

7. The display device according to claim 6, wherein the plurality of light-emitting units comprise a submillimeter light-emitting diode.

8. The display device according to claim 6, wherein the driver executes the local dimming process based on gamma 2.2 of the display device.

9. The display device according to claim 6, wherein the luminance adjustment ratio ranges from 1% to 100%.

10. The display device according to claim 6, wherein the driver performs a detailed node interpolation tuning by a plurality of partial peak ratio comparison tables.

* * * * *